US010788731B2

(12) United States Patent
Shikama et al.

(10) Patent No.: US 10,788,731 B2
(45) Date of Patent: Sep. 29, 2020

(54) BLADE DRIVE DEVICE

(71) Applicant: NIDEC COPAL CORPORATION, Tokyo (JP)

(72) Inventors: Kazuo Shikama, Tokyo (JP); Shozo Iwato, Tokyo (JP); Kenzo Imai, Tokyo (JP); Longji Bai, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 16/322,422

(22) PCT Filed: May 26, 2017

(86) PCT No.: PCT/JP2017/019646
§ 371 (c)(1),
(2) Date: Jan. 31, 2019

(87) PCT Pub. No.: WO2018/025472
PCT Pub. Date: Feb. 8, 2018

(65) Prior Publication Data
US 2019/0196301 A1 Jun. 27, 2019

(30) Foreign Application Priority Data
Aug. 1, 2016 (JP) .................................. 2016-151342

(51) Int. Cl.
*G03B 9/10* (2006.01)
*G03B 9/02* (2006.01)
(Continued)

(52) U.S. Cl.
CPC ................. *G03B 9/02* (2013.01); *G03B 9/10* (2013.01); *G03B 9/14* (2013.01); *H04N 5/2254* (2013.01); *G03B 9/24* (2013.01)

(58) Field of Classification Search
USPC ......................................................... 396/493
See application file for complete search history.

(56) References Cited

U.S. PATENT DOCUMENTS

2004/0222709 A1* 11/2004 Naganuma ............... G03B 7/10
310/36
2009/0034046 A1* 2/2009 Bai ......................... G03B 9/10
359/230
(Continued)

FOREIGN PATENT DOCUMENTS

JP 2003-330059 A 11/2003
JP 2005-37866 A 2/2005
(Continued)

OTHER PUBLICATIONS

International Search Report and Written Opinion for Application No. PCT/JP2017/019646 dated Jul. 11, 2017.

*Primary Examiner* — Rodney E Fuller
(74) *Attorney, Agent, or Firm* — Troutman Pepper Hamilton Sanders LLP

(57) ABSTRACT

Because a thin blade is disposed in a space that has a thickness in the optical axial direction, which contains a coil and a magnet, when the blade is driven the blade tends to become unstable, making smooth operation of the thin blade difficult. A blade driving device has a driving member; a frame that is provided with a driving frame chamber that contains the driving member; a blade supporting unit that has an opening and that structures a blade chamber that is separate from the driving frame chamber; and a blade member that is contained in the blade chamber, and that is moved by the driving member to advance into the opening.

16 Claims, 11 Drawing Sheets

(51) Int. Cl.
      *G03B 9/14*         (2006.01)
      *H04N 5/225*     (2006.01)
      *G03B 9/24*         (2006.01)

(56) References Cited

U.S. PATENT DOCUMENTS

| | | | |
|---|---|---|---|
| 2017/0075193 A1* | 3/2017 | Masuzawa | H04N 5/2257 |
| 2019/0049692 A1* | 2/2019 | Choi | G02B 7/09 |
| 2019/0146307 A1* | 5/2019 | Ito | G03B 9/42 |
| | | | 396/483 |

FOREIGN PATENT DOCUMENTS

| | | |
|---|---|---|
| JP | 2005-189657 A | 7/2005 |
| JP | 2007-33650 A | 2/2007 |
| JP | 2008-83203 A | 4/2008 |

* cited by examiner

BLADE DRIVE DEVICE

CROSS REFERENCE TO RELATED APPLICATIONS

This application is the National Stage of International Application PCT/JP2017/019646 filed May 26, 2017, which published as WO 2018/025472 on Feb. 8, 2018. The International Application claims priority to Japanese Application No. 2016-151342 filed Aug. 1, 2016. All of the above applications are incorporated herein by reference in their entirety.

FIELD OF TECHNOLOGY

The present invention relates to a blade driving device for driving a blade.

BACKGROUND

Blade driving devices are used to change the state of an opening by driving one or more blade members that advance into the opening, and are used in a variety up optical units, such as camera units, for irises, shutters, iris-shutters, filters, and the like. As conventional blade driving devices those of the electromagnetically-driven type, that use magnets and coils as driving sources, are well known (see, Japanese Unexamined Patent Application Publication 2001-281724).

SUMMARY

In the conventional blade driving device, described above, the blade and the driving source, such as a coil, are disposed on a base plate that has an opening, where the coil or the magnet as the driving source is disposed within a space that is shared with the blade, without a partition.

With such a conventional blade driving device, because a thin blade is disposed in a space that has thickness, in the axial direction, that contains a coil and/or a magnetic, when the blade is driven the blade tends to become unstable, and thus there is a problem in that this makes smooth operation of the thin blade difficult. Moreover, because there is a tendency for dust that is produced through the action of the driving source to adhere thereto, there is a problem in that the durability of the blade that moves is not adequately high.

In the present invention, the handling of such problems is the problem to be solved. That is, the object of the present invention is to provide a structure wherein the blade is not affected by the action of the driving source, and that not only causes the action of the blade to be smooth, but also improves the durability of the blade.

In order to solve such a problem, the lens driving device according to the present invention is provided with the following structures:

A blade driving device having a driving member; a frame that is provided with a driving frame chamber that contains the driving member; a blade supporting unit that has an opening and that structures a blade chamber that is separate from the driving frame chamber; and a blade member that is contained in the blade chamber, and that is moved by the driving member to advance into the opening.

BRIEF DESCRIPTIONS OF THE DRAWINGS

FIG. 5(b) is an explanatory diagram depicting the state wherein the blade driving device is assembled onto the lens frame in a plan view).

DETAILED DESCRIPTION

A blade driving device according to an embodiment according to the present invention is equipped with the structure described above, where a driving frame chamber that contains the driving member and a blade chamber that contains the blade member are separated spatially. Through this, the blade supporting unit that structures the blade chamber is supported so as to enable smooth movement of a blade member that is in a thin shape. Moreover, because the blade member is contained within a blade chamber that is separate from the driving frame chamber, the dust from the action of the driving member is blocked, enabling an increase in durability of the blade member.

Embodiments according to the present invention will be explained below in reference to the drawings. In the descriptions below, identical reference symbols in the different drawings below indicate positions with identical functions, and redundant explanations in the various drawings are omitted as appropriate. In the figure, the arrow in the Z direction indicates the optical axial direction (the thickness direction of the blade driving device; the arrow X indicates the direction of movement of the blade member; and the direction of the arrow Y indicates a direction that is perpendicular to the X and Z directions.

Figure 1:
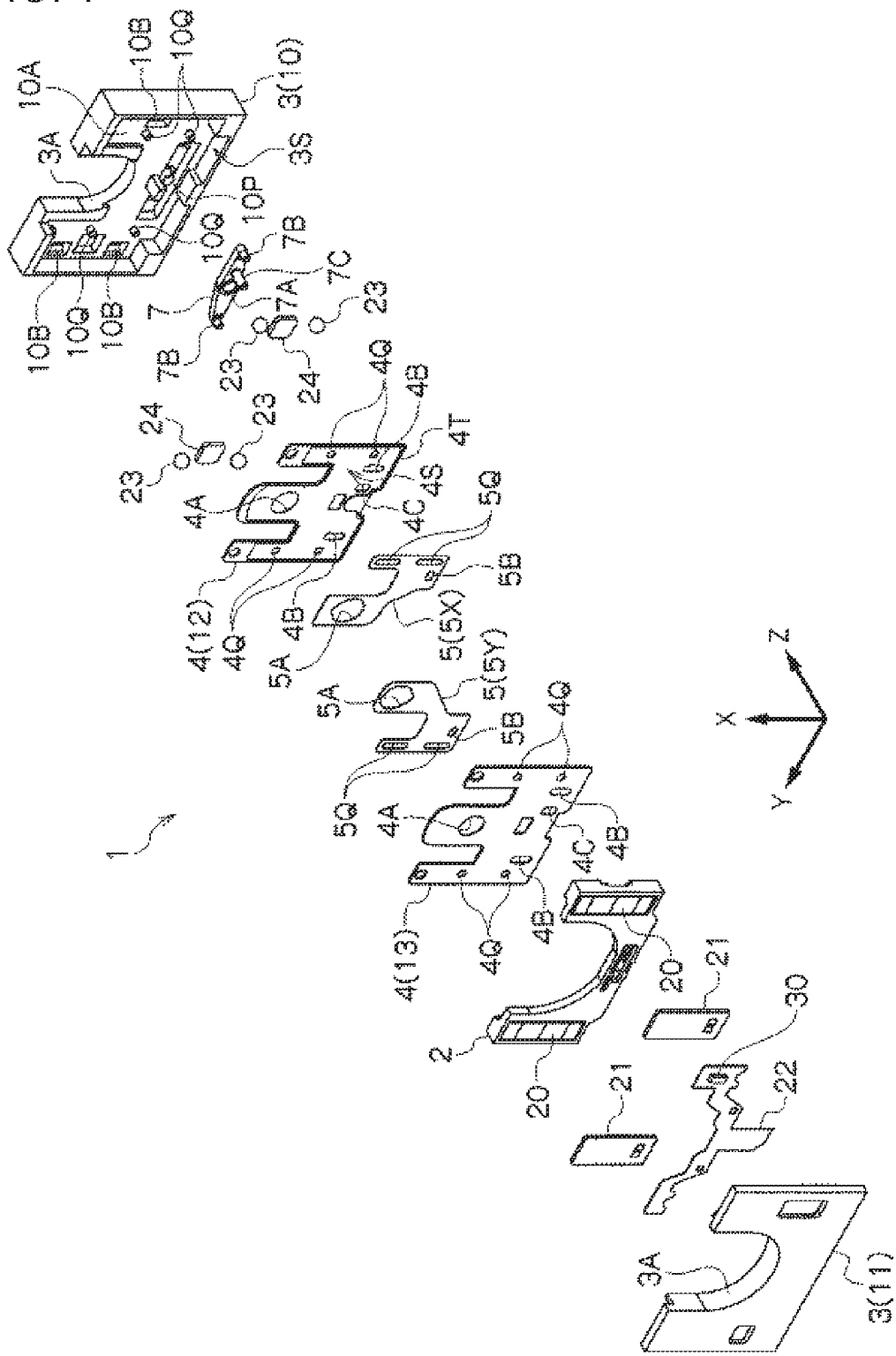
FIG. 1 is an exploded perspective diagram depicting a blade driving device according to an embodiment according to the present invention.

As illustrated in FIG. 1, a blade driving device 1 in an embodiment according to the present invention comprises a driving member 2, a frame 3, a blade supporting unit 4, and blade members 5 (5X and 5Y). The frame 3 is structured from a base frame 10 and a cover frame 11 that covers the base frame 10, to form a driving frame chamber 3S that contains the driving member 2 therein. The driving member 2 is supported movably on a supporting face 10A of the base frame 10, so as to move the blade members 5 (5X and 5Y) through moving on a plane.

A magnet 20 and a coil 21, which are the driving source, are attached to the driving member 2 and the frame 3. In the example in FIG. 1, the magnet 20 is attached to the driving member 2 and the coil 21 is attached to the frame 3 (the cover frame 11), where power is applied to the coil 21 through a wiring board (a flexible substrate) 22, to cause the driving member 2 to undergo reciprocating motion in the X direction in the figure. The driving member 2 is supported movably in a supporting groove 10B of a supporting face 10A on a bearing 23. Moreover, a Hall element (detecting member) 30, for detecting movement of the driving member 2 or the blade member 5 (5X, 5Y) is disposed on the wiring board 22 at a position corresponding to the magnet 20. Note that the driving source is disposed horizontally, or essentially horizontally, in relation to the direction in which a protruding part 4P, described below, is inserted into a slit 6S (hereinafter termed the "insertion direction").

The blade members 5 (5X, 5Y) are connected to the driving member 2, either directly or through connecting members 7. In the example depicted in FIG. 1, the connecting member 7 is borne within the frame 3. In the connecting member 7, a bearing portion 7A, in the center, is borne on a shaft 10P of the base frame 10, where connecting portions 7B, on both ends thereof, pass through elongated holes 4B of the blade supporting unit 4, and are respectively connected in connecting holes 5B of the blade members 5X and 5Y, where, near the center, the connecting portion 7C passes through an elongated hole 4C of the blade supporting unit 4, and is connected to the driving member 2. Through this, when the driving member 2 undergoes reciprocating motion linearly along the X direction, the connecting member 7 rotates around the shaft 10P, so that the blade members 5X and 5Y, which are connected to the connecting portions 7B, move in mutually opposing directions along the X direction.

The blade member 5 (5X, 5Y) is supported on a blade supporting unit 4. The blade supporting unit 4 is structured from a pair of supporting plates 12 and 13, made from thin metal plates, or the like. The pair of blade supporting plates 12 and 13, which are thin members, hold the blade member 5 (5X, 5Y) therebetween, and stepped portions 4T, at the periphery edges thereof, are attached together, to form a blade chamber 4S that contains the blade member 5 (5X, 5Y) in the interior thereof. The blade supporting unit 4 has an opening 4A around the optical axis, along the thickness direction (the Z direction in the drawings) of the frame 3. The blade member 5 (5X, 5Y) is moved, by the driving member 2, to advance into the opening 4A. In the example in the figure, the blade member 5 (5X, 5Y) has an opening 5A, where the degree of overlap of the opening 5A in the opening 4A is adjusted variably by the movement in the X direction in the figure.

Explaining, in greater detail, the example in the figure, a protrusion 10Q of the base frame 10 fits into a hole 4Q of the blade supporting unit 4, to engage the blade supporting unit 4 with the base frame 10, and, additionally, the protrusion 10Q is inserted into a guide hole (elongated hole) 5Q of the blade member 5 (5X, 5Y) that is supported on the blade supporting unit 4, to guide the movement of the blade member 5 (5X, 5Y). Moreover, within the frame 3 (the base frame 10), a magnetic material 24 is disposed to hold the blade member 5 in an initial position, and to attract the driving (frame) member 2 in the optical axial direction relative to the base frame 10.

Figure 2A:
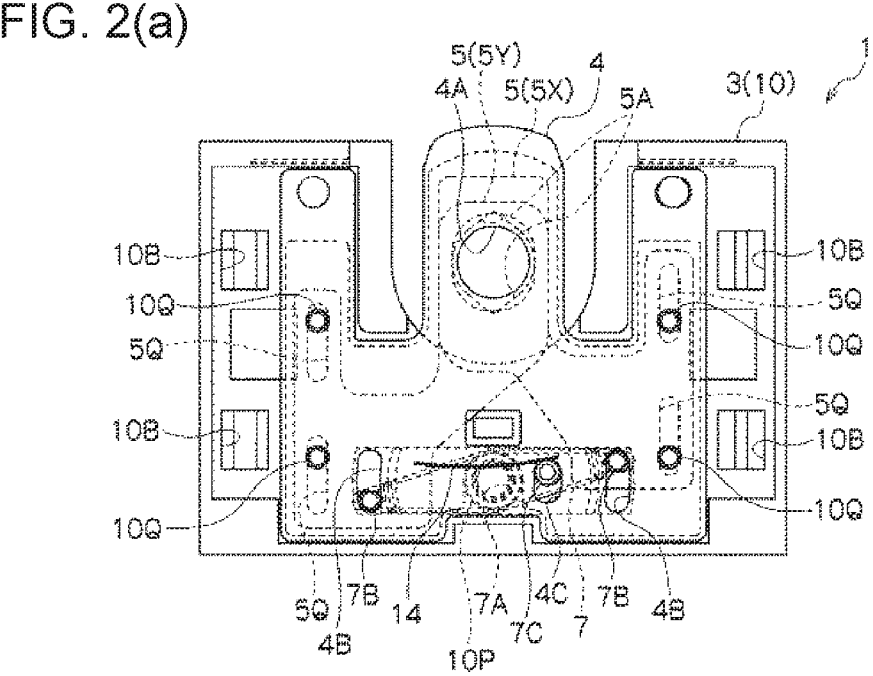
FIG. 2(a) is an explanatory diagram depicting the movement of the blade member showing the fully opened state.
Figure 2B:
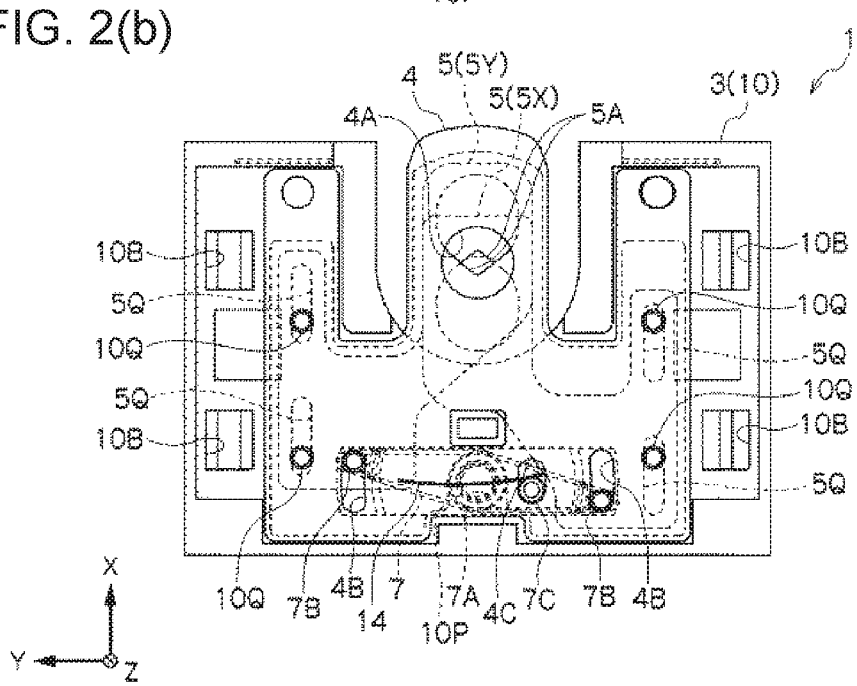
FIG. 2(b) is an explanatory diagram depicting the movement of the blade member showing the closed state.

FIG. 2 depicts the movement of the blade member 5 (5X, 5Y). In the example in the figure, an example is shown wherein the blade driving device 1 has the function of an iris device for variably adjusting the brightness of light that passes through the opening 4A. (a) depicts the fully open state of the opening 4A through the rotation of the connecting member 7 by the movement of the driving member 2 (not shown), described above, and (b) depicts the state wherein the opening area is closed through overlapping of the opening 5A within the opening 4A. While, in the example in the figure, an example of an iris device is depicted, the blade driving device 1 may instead function as a shutter device for blocking the light that passes through the opening 4A by fully closing the opening 4A by the blade members 5 (5X and 5Y) overlapping, or may function as a filter device through attaching a filter, for limiting the wavelengths or brightness of the light, to end portions of the openings 5A of the blade members 5 (5X and 5Y).

Note that in the example depicted in FIG. 2, in the connecting portion between the driving member 2, not shown, and the connecting member 7, one end is secured to the driving member 2, and the other end is provided with an elastic member (a leaf spring) 14 that presses the connecting portion 7C of the connecting member 7. Through connecting the driving member 2 and the connecting member 7 through the elastic member 14 in this way, the movement of the driving member 2 can be transmitted to the connecting member 7 without rattling, making it possible to increase the accuracy of movement of the blade members 5 (5X and 5Y), enabling an increase in the accuracy of brightness adjustment.

Figure 3:
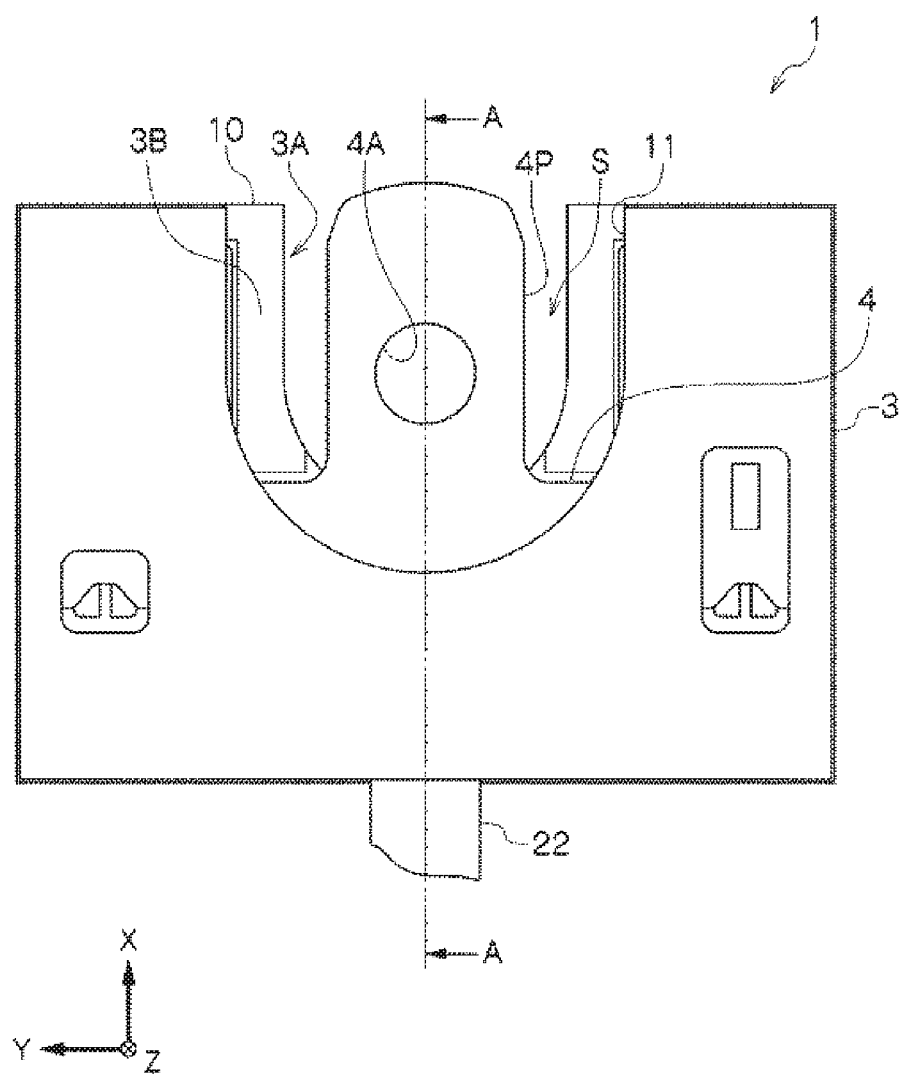
FIG. 3 is an external view (plan view) of a blade driving device according to an embodiment according to the present invention.
Figure 4:
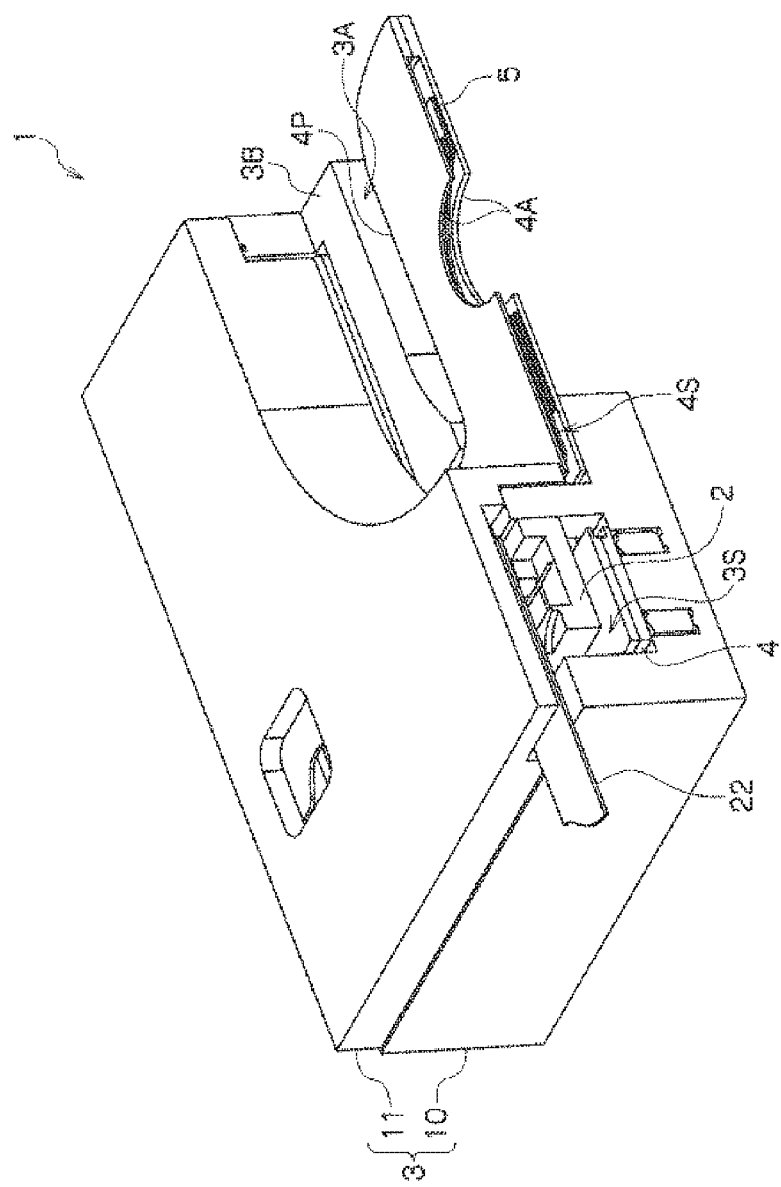
FIG. 4 is a perspective diagram of the A-A cross-section in FIG. 3.

FIG. 3 depicts an external view of the blade driving device 1, and FIG. 4 depicts a perspective diagram along the cross-section A-A in FIG. 3. In the blade driving device 1, the frame 3 structures a driving frame chamber 3S that contains the driving member 2, and the blade supporting unit 4 structures a blade chamber 4S that is separate from the driving frame chamber 3S. Moreover, the blade supporting unit 4, which contains the blade member 5, protrudes to the outside along the direction of movement of the driving member 2 (the X direction in the figure) from part of the thickness of the frame 3, between the base frame 10 and the cover frame 11, and the opening 4A of the blade supporting unit 4 is located outside of the frame 3. The blade supporting unit 4 is a member of a thin shape, structured so as to be thinner than the thickness of the frame 3.

The outer peripheral edge of the frame 3 has a recessed portion 3A at the position wherein the blade supporting unit 4 protrudes. Through this, the protruding part 4P and opening 4A of the blade supporting unit 4 are located within a space that is outside of the frame 3, because of the recessed portion 3A. Moreover, a stepped portion 3B for supporting the content, by the frame 3, is provided in the recessed portion 3A of the frame 3. Given this, a gap S is formed between the protruding part 4P of the blade supporting unit 4 that protrudes in the recessed portion 3A, and the outer periphery of the recessed portion 3A of the frame 3.

Given the blade driving device 1, described above, first the blade supporting unit 4 that structures the blade chamber 4S can support the thin blade member 5 so as to enable smooth movement thereof. Moreover, because the blade member 5 is contained within the blade chamber 4S, which is separate from the driving frame chamber 3S, the dust due to the action of the driving member 2 is blocked, enabling the durability of the blade member 5 to be increased.

Moreover, the thin blade supporting unit 4 protrudes the outside, from a portion of the frame 3, in the thickness direction thereof, and an opening 4A is provided in this protruding part 4P, and thus the protruding part 4P enables the opening 4A to be disposed on the optical axis of the optical components, through insertion of the protruding part 4P from the outside in respect to the optical components, such as the lens frame. Through this, this can prevent the optical components and the blade driving device 1 from being disposed stacked in the optical axial direction, enabling the combination of the optical components and the blade driving device 1 to be structured more thinly.

Moreover, a gap S is provided between the protruding part 4P of the blade supporting unit 4 and the outer periphery of the recessed portion 3A of the frame 3, and the protruding part 4P protrudes in a cantilevered state, thus enabling insertion of the protruding part 4P from the outside of a portion of the integrated optical components, enabling the opening 4A to be disposed on the optical axis of the optical components. This makes it possible to install the blade driving device 1 into the assembled optical components after completion of adjustments, and the like, of the optical components, enabling a simplification in the adjustments of the optical components that are to be assembled together with the blade driving device 1. Note that, conversely, the adjustments to the optical components may be carried out after assembly together with the blade driving device 1.

Note that while the example in the figure depicted in an example wherein the driving member 2 is a VCM (Voice Coil Motor) as a driving mechanism for causing reciprocating motion on a plane, the driving method is not limited particularly thereto, but rather any of a variety of driving methods may be used.

Figure 5A:
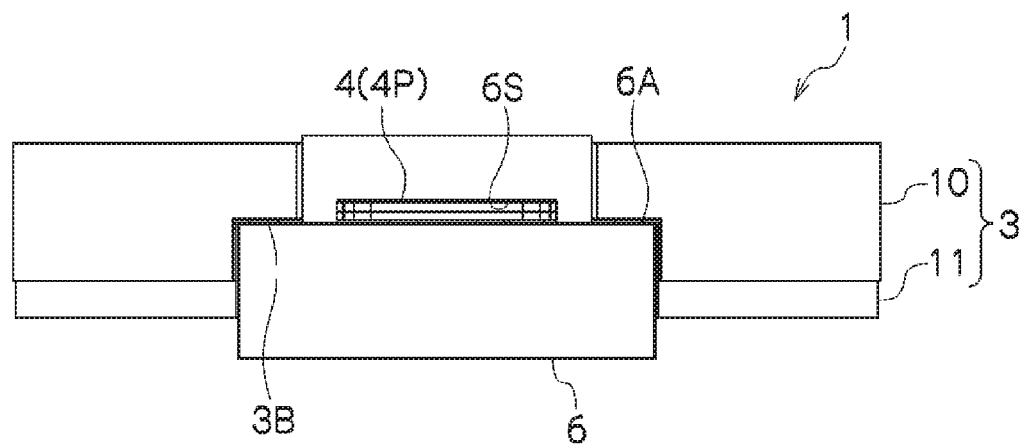
FIG. 5(a) is an explanatory diagram depicting the state wherein the blade driving device is assembled onto the lens frame showing a front view.
Figure 5A:
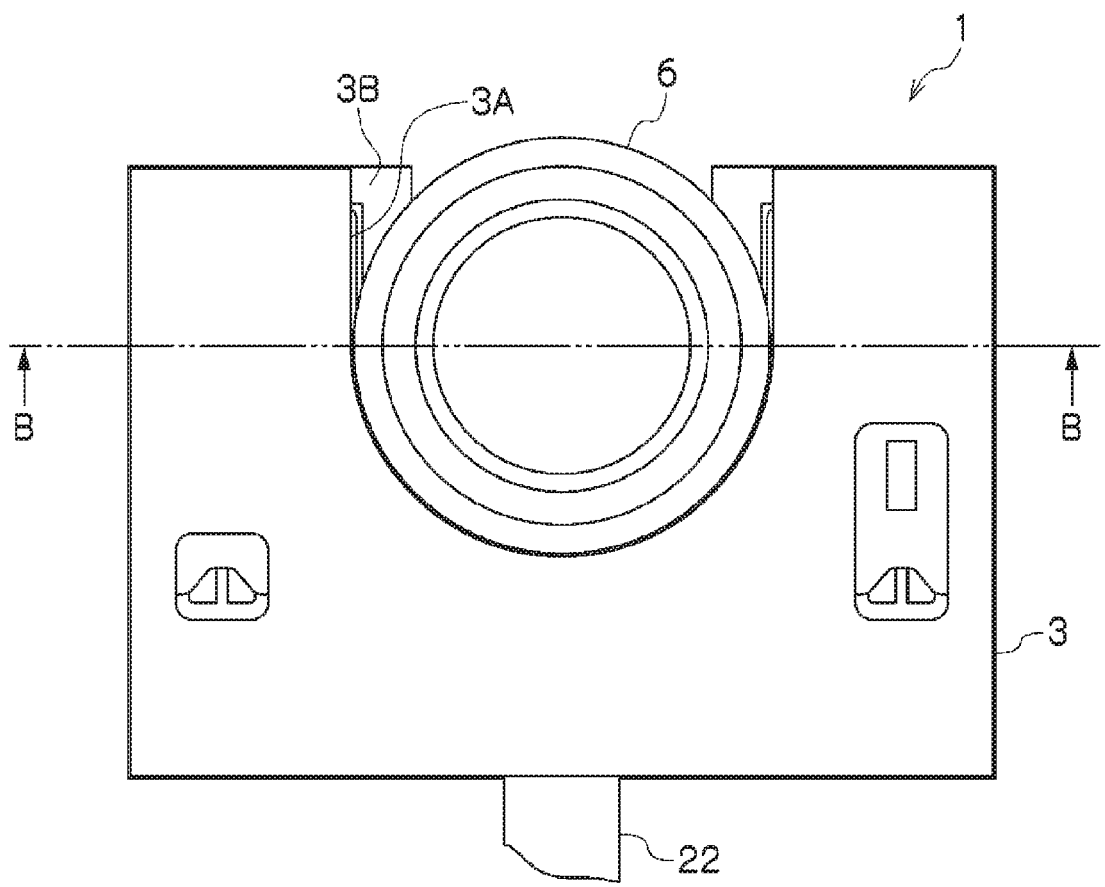
Figure 6:
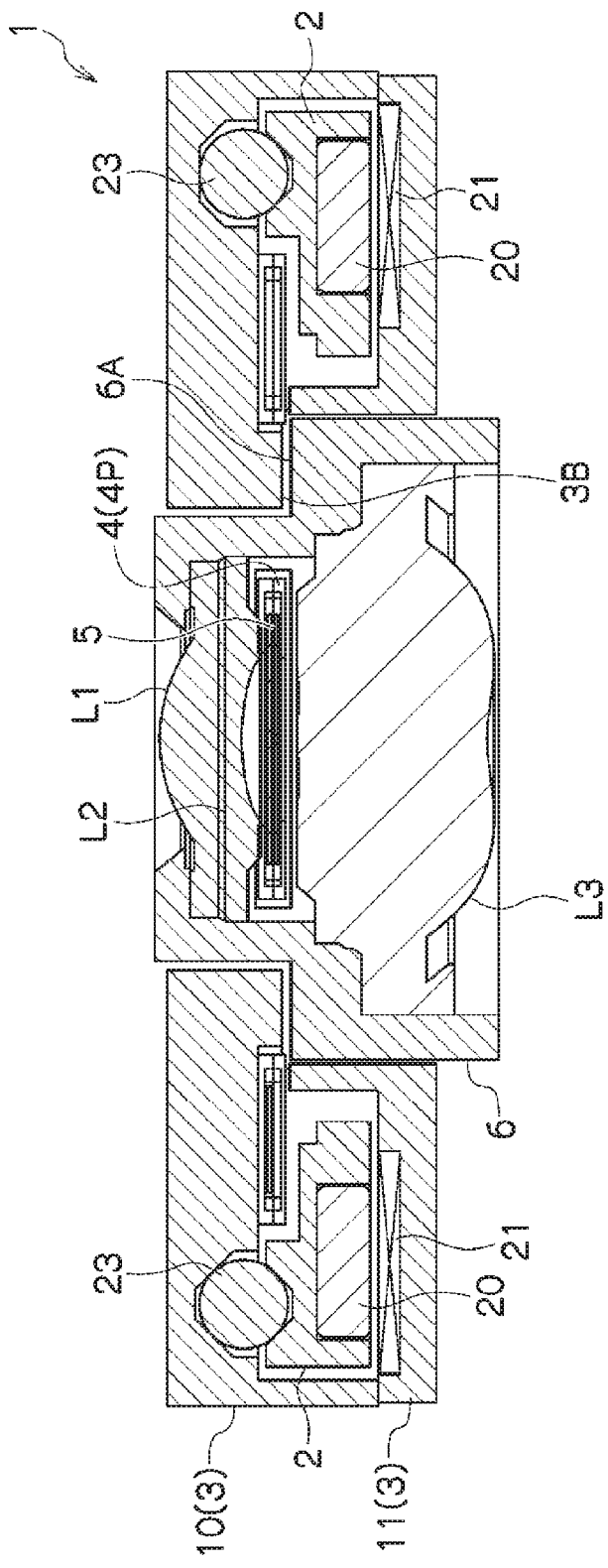
FIG. 6 is a cross-sectional view along the section B-B in FIG. 5(b).

FIG. 5 and FIG. 6 depicts the state wherein the blade driving device 1 is assembled together with a lens frame 6. The lens frame 6 is provided with a slit 6S on a side face, where the protruding part 4P of the blade supporting unit 4 is inserted into the slit 6S of the lens frame 6, contained within the recessed portion 3A of the frame 3. The lens frame 6 supports, as a single unit, lenses L1, L2, and L3 that are disposed to the front and the rear of the blade supporting unit 4. Here the protruding part 4P of the blade supporting unit 4 is inserted into a space between the lens L2 and the lens L3, where the lenses L1 and L2 are disposed to the front side (the object side as parent of the blade supporting unit 4, and the lens L3 is disposed to the rear side (the imaging element side) of the blade supporting unit 4. A stepped portion 6A is provided on a side frame in the lens frame 6, where the stepped portion 6A rests on the stepped portion 3B of the frame 3, to assemble the blade driving device 1 with good seating in relation to the lens frame 6. However, in another embodiment, the stepped portion 3B and the stepped portion 6A need not necessarily be provided. In such a case, assembly to the frame 3 is possible regardless of the front/back orientation of the lens frame 6.

Such a structural example enables the lens frame 6, which supports the lenses L1, L2, and L3, integrally, to have the adjustments between lenses, and the like, be carried out with the lens frame 6 independently, and the blade supporting unit 4 is inserted into the slit 6S, to assemble the blade driving device 1 together with the lens frame 6, after these adjustments. Moreover, the blade supporting unit 4 is inserted onto the optical axis of the lens frame 6 from the side of the lens frame 6, enabling the assembly to be thin in the optical axial direction, rather than the lens frame 6 and the blade driving device 1 being stacked in the optical axial direction. At this time, because the optical axial direction thickness of the frame 3 is thin when compared to the optical axial direction of thickness of the lens frame 6, the blade driving device 1 can be assembled together within the thickness of the lens frame 6, enabling assembly with good spatial efficiency along the optical axial direction. Note that, although omitted from the drawings, the slit 6S is formed passing all the way through the interior of the lens frame 6. Because of this, at the time of assembly, the protruding part 4P may be inserted from either side of the lens frame 6 (slit 6S). However, in another embodiment, the slit 6S need not pass all the way through.

Figure 7:
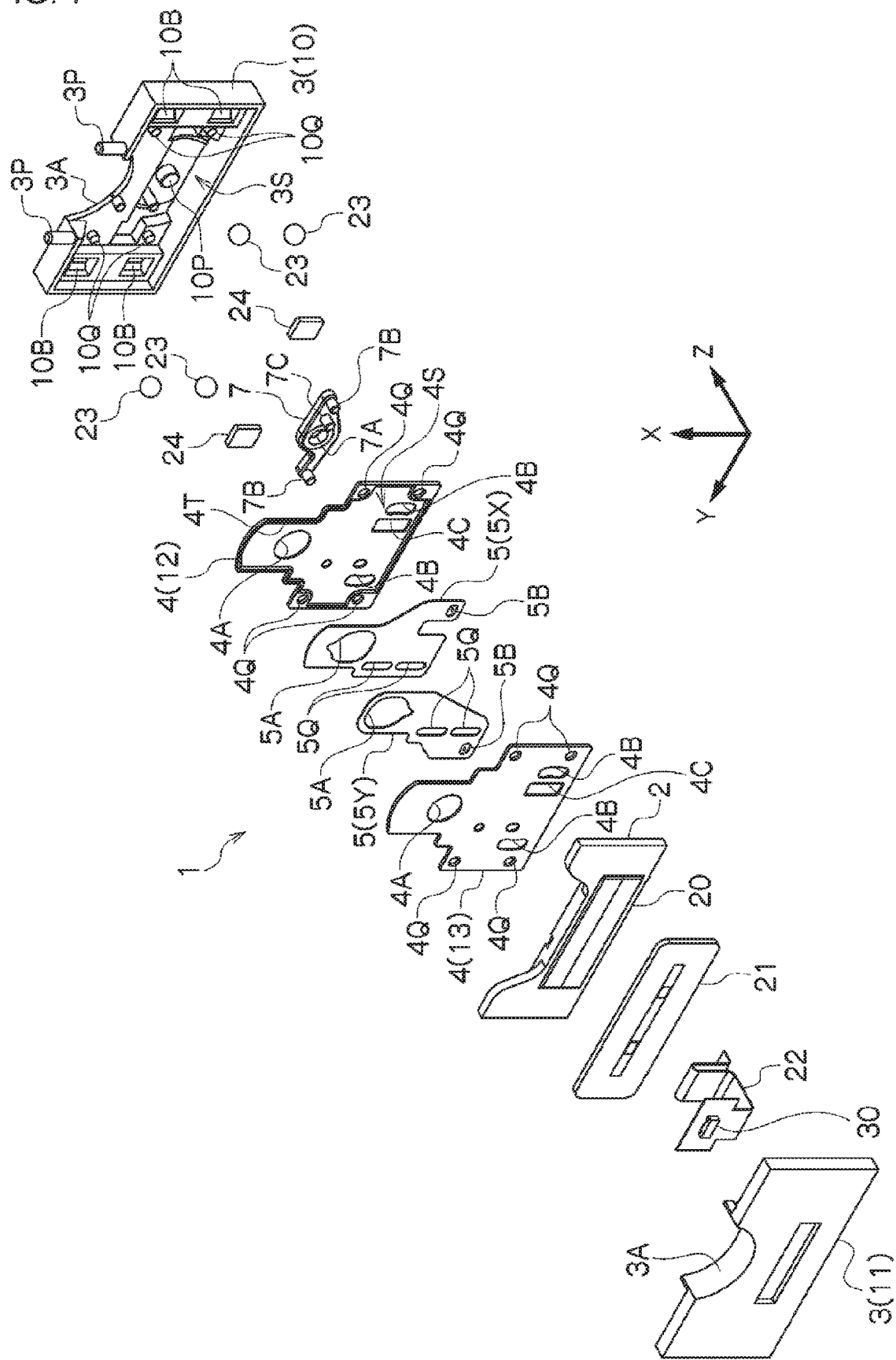
FIG. 7 is an exploded perspective diagram depicting another structural example of the blade driving device.
Figure 8:
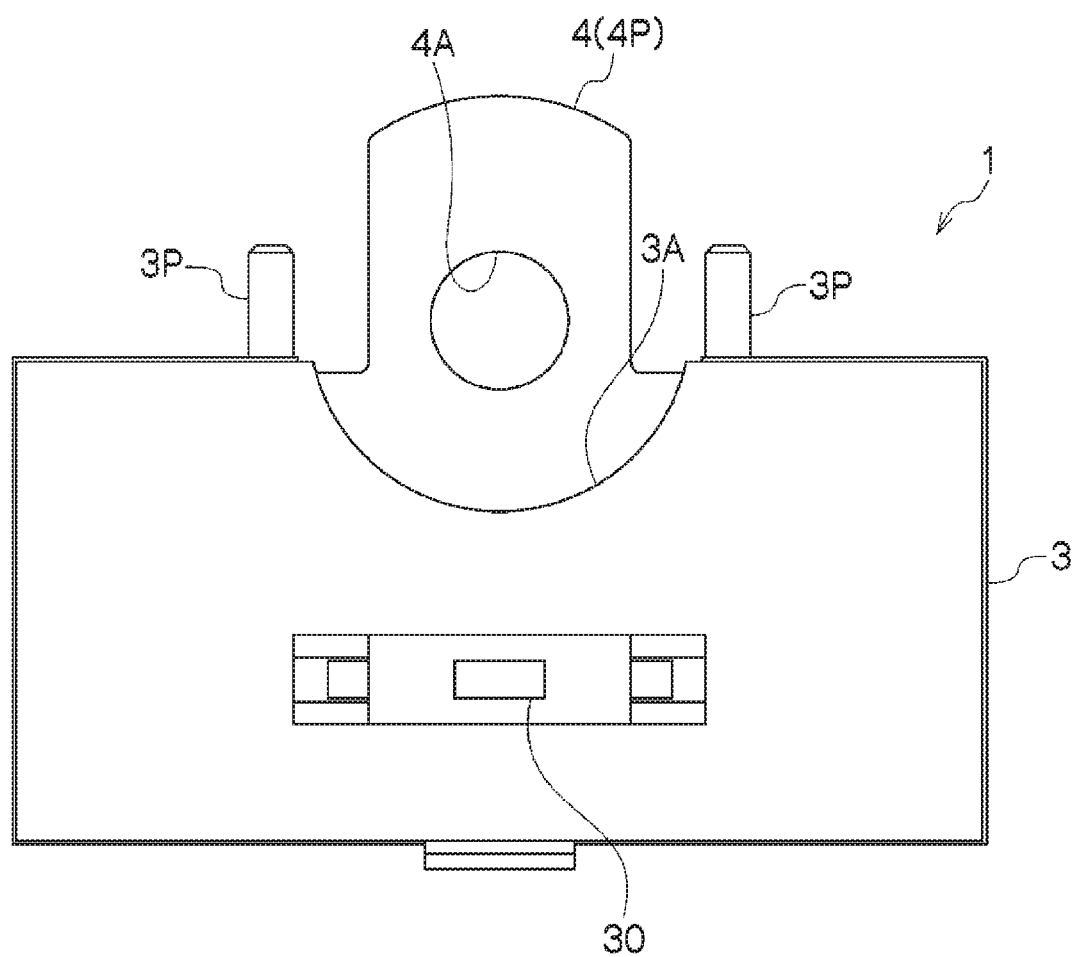
FIG. 8 is a plan view depicting another structural example of the blade driving device.

FIG. 7 and FIG. 8 depicts another structural example of a blade driving device 1. In the blade driving device 1 depicted in FIG. 1, the magnet 20 and the coil 21 that are the driving source were provided extending along the direction of protrusion of the blade supporting unit 4 within the frame 3 (the X direction in the figure). In contrast, in the example depicted in FIG. 7, the magnet 20 and the coil 21 that are the driving source extend along the direction that is perpendicular (the Y direction in the figure) relative to the direction of protrusion of the blade supporting unit 4 within the frame 3 (the X direction in the figure). In the example in FIG. 7 as well, the driving member 2 moves in the X direction in the figures, so driving is the same as in the example depicted in FIG. 1.

For the direction in which the driving source extends, this direction may be selected as appropriate in order to provide the desired driving force in the direction of movement of the driving member 2 (the X direction in the figures). For example, the example in FIG. 1 and the example in FIG. 7 may be combined with the driving source (the magnet 20 and the coil 21) provided extending along the direction of protrusion of the blade supporting unit 4 in the frame 3 (the X direction in the figures), and provided extending in the direction that is perpendicular to the direction in which the blade supporting unit 4 protrudes (the X direction in the figures). For example, a portion of the driving source may be provided extending along the direction of protrusion of the blade supporting unit 4 (the X direction in the figures), and provided in a direction that is perpendicular to the direction of protrusion (the X direction in the figure), with the driving source in a L shape.

Note that the driving source is disposed perpendicularly, or essentially perpendicularly, in relation to the direction of insertion. Moreover, in another embodiment, the example in FIG. 1 and the example in FIG. 7 may be combined, provided with both a driving source that is provided along the direction of protrusion of the blade supporting unit 4 (the X direction in the figures) and a driving source that is provided in a direction that is perpendicular to the direction of protrusion of the blade supporting unit 4 (the X direction in the figures).

Moreover, in the example depicted in FIG. 7 and FIG. 8, the frame 3 is provided with an attaching protrusion 3P. This makes it possible to assemble the blade driving device 1 easily to a side face, or the like, of the lens frame through the provision of a fitting hole, in the side face of the lens frame, or the like, into which the attaching protrusion 3P is inserted.

Figure 9:
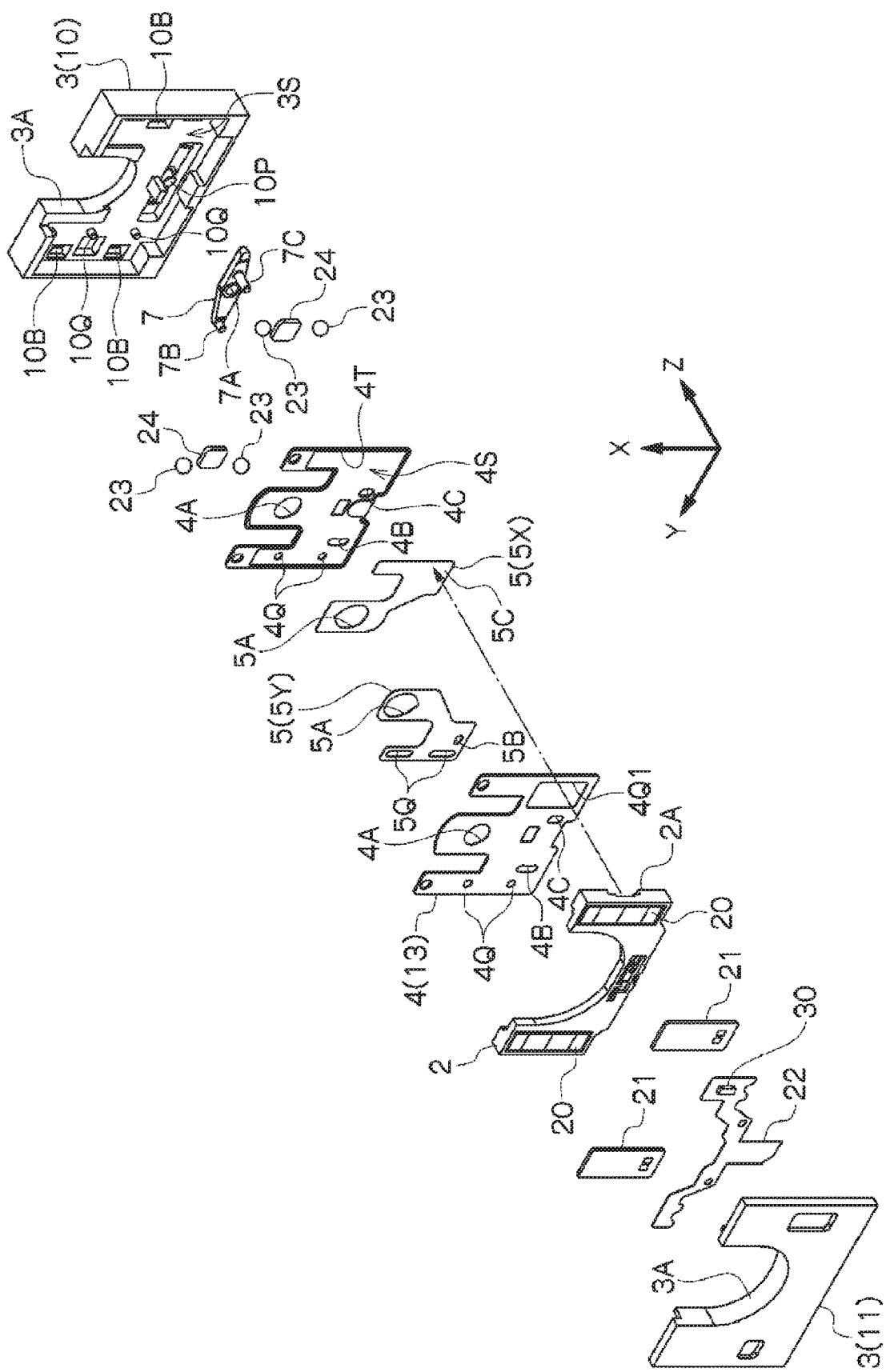
FIG. 9 is an exploded perspective diagram depicting another structural example of the blade driving device.

FIG. 9 depicts another structural example of a blade driving device 1. In this example, in the blade member 5, a plurality of blade members 5X and 5Y are provided overlapping, where one of the blade members 5X is secured directly to the driving member 2 and the other blade member 5Y is connected through a connecting member 7 to the driving member 2. Specifically, the securing portion 2A of the driving member 2 is secured directly to a secured portion 5C of the blade member 5X through a hole 4Q1 of the blade supporting unit 4. Moreover, the driving member 2 is connected to a connecting portion 7C of the connecting member 7. When the driving member 2 moves in the X direction in the figures, the blade member 5X moves integrally therewith, and, the connecting member 7 is rotated around the shaft 10P. The blade member 5Y that is connected through the connecting hole 5B to the connecting portion 7B at the end portion of the connecting member 7 moves in the opposite direction from that of the blade member 5X.

In the example depicted in FIG. 9, the one blade member 5X moves integrally with the driving member 2, and thus in the mechanism wherein the pair of blade members 5X and 5Y are moved in mutually opposing directions by a single driving member 2, there will be less of a rattling effect than there would be in a case wherein both of the blade members 5X and 5Y were connected through connecting members 7, enabling an improvement in the movement accuracy of the blade members 5X and 5Y. Through this, this enables, for example, a brightness adjustment with better accuracy. Note that the driving member 2 may be divided into left and right sides, and the blade member 5X and the blade member 5Y may be secured directly to the respective driving members 2. In this case, the connecting member 7 would be unnecessary, enabling a brightness adjustment with even higher accuracy.

Figure 10:
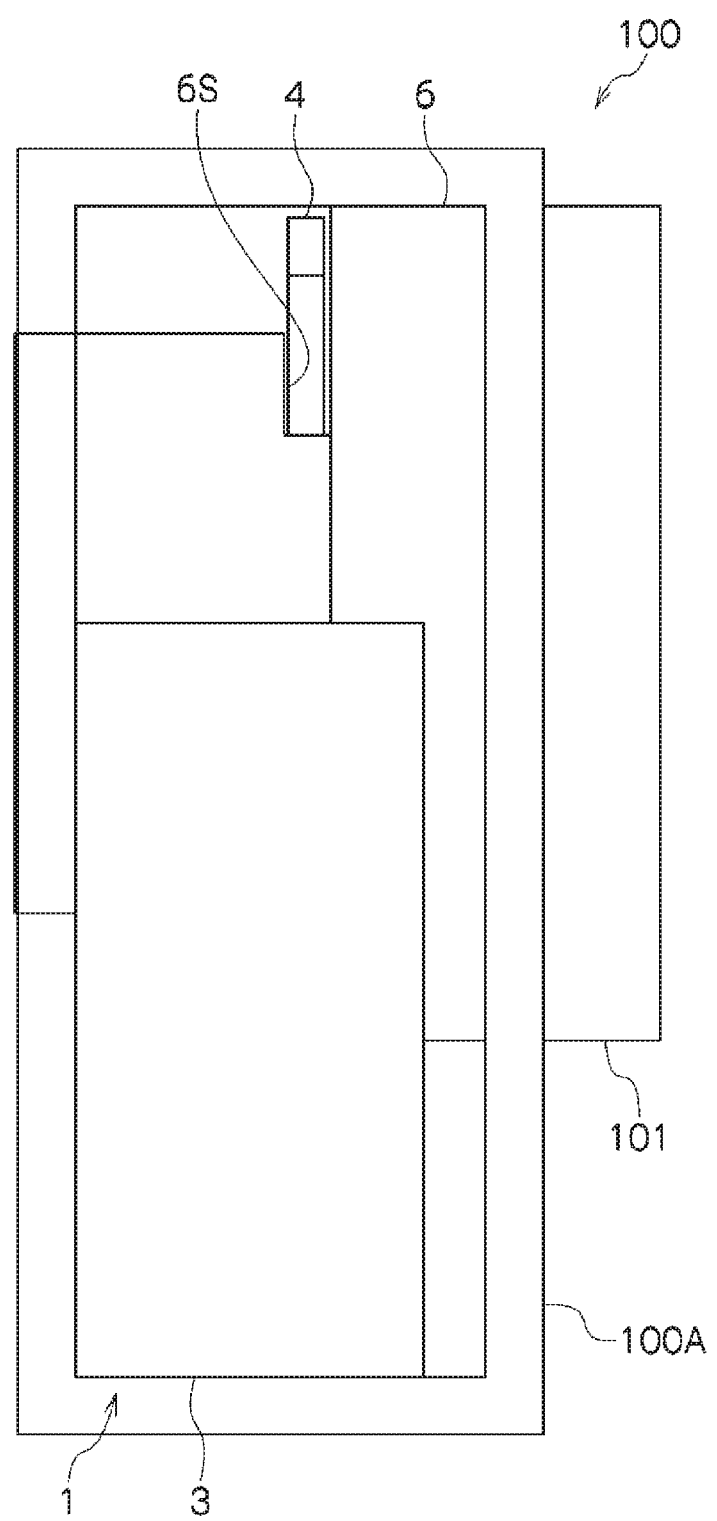
FIG. 10 is an explanatory diagram depicting a camera equipped with the blade driving device.

FIG. 10 depicts a camera 100 as an optical unit that is provided with the blade driving device 1. The blade driving device 1 may be assembled together with the lens frame 6 as described above, and may be mounted in a case 100A wherein an imaging element 101 is mounted, to structure a camera 100. Moreover, various types of optical units can be produced through assembling the blade driving device 1 together with other optical components. Such a camera 100 or optical unit can be made thinner, enabling a reduction in the thickness of the space for installation along the optical axial direction. Moreover, because the blade driving device 1 can be assembled and integrated after the adjustments to the lens frame 6, and the like, have been completed, this enables simple and highly accurate adjustments, and enables simple mounting through integration of the blade driving device 1.

Figure 11:
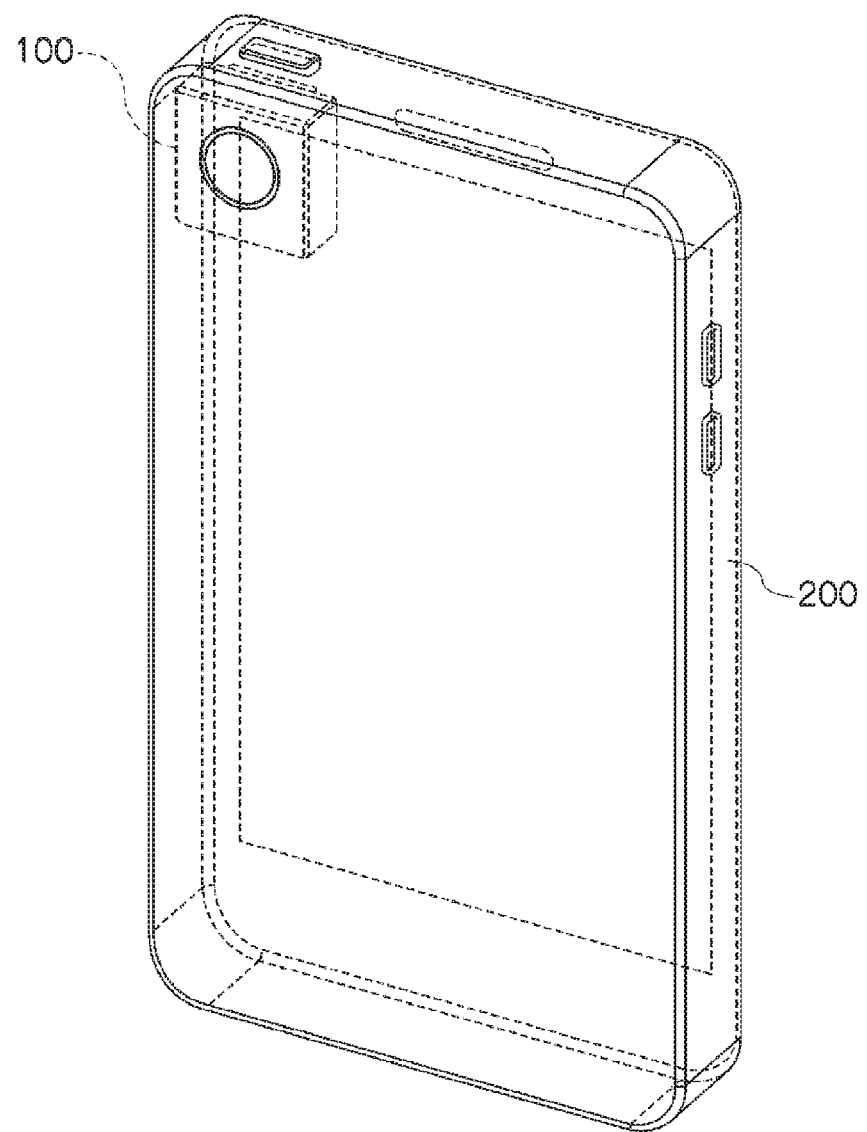
FIG. 11 is an explanatory diagram depicting a mobile electronic device equipped with the blade driving device (camera).

FIG. 11 depicts a mobile electronic device (mobile information terminal) 200 that is equipped with the camera 100 described above. The mobile electronic device 200, such as a smart phone, or the like, has severe limitations on the thickness of the units packaged in the interior thereof, but the camera 100, as described above, enables a reduction in thickness through assembly with the blade driving device 1 contained within the thickness of the lens frame 6, thus enabling packaging with excellent spatial efficiency in a mobile electronic device 200 that targets high portability and design characteristics. Note that the members disposed within the frame 3 in these examples have the layout positions and shapes designed so as to be assembled sequentially from one side of the base frame 10.

While embodiments according to the present invention were described in detail above, referencing the drawings, the specific structures thereof are not limited to these embodiments, but rather design variations within a range that does not deviate from the spirit and intent of the present invention are also included in the present invention. In particular, while in the embodiments set forth above, the frame 3 of the blade driving device 1 was structured from a member that was separate from the blade supporting unit 4, instead the frame 3 may be structured integrally with the blade supporting unit 4, and the driving frame chamber 3S within the frame 3 and the blade chamber 4S within the blade supporting unit 4 may be separated through a partition. Moreover, insofar as there are no particular contradictions or problems in purposes or structures, or the like, the technologies of the various embodiments described above may be used together in combination.

The invention claimed is:

1. A blade driving device, comprising:
    a driving member;
    a frame equipped with a driving frame chamber that contains the driving member;
    a blade supporting member that has an opening, and that structures a blade chamber that is separate from the driving frame chamber; and
    a blade member that is contained in the blade chamber and that is moved by the driving member to advance into the opening,
    wherein the blade supporting member is disposed with a portion thereof protruding to the outside of the frame, with the opening outside of the frame,
    wherein in the frame, a recessed portion is formed in an outer peripheral edge, and the blade supporting member protrudes into the recessed portion,
    wherein a lens frame that has a slit into which the blade supporting member is inserted is contained in the recessed portion,
    wherein the frame includes a first subframe and a second subframe, the first subframe defines a first recess on a first plane perpendicular to the optical axis, the second subframe defines a second recess on a second plane perpendicular to the optical axis, the first recess and the second recess together form the recessed portion,
    wherein the blade supporting member includes a protruding member that extends in a direction parallel to the first plane and the second plane, the protruding member overlaps at least in part with the recessed portion, and the blade supporting member is sandwiched between the two subframes, and
    wherein the opening is formed in the protruding member.

2. The blade driving device as set forth in claim 1, wherein:
    a stepped portion, wherein the lens frame is supported by the frame, is provided in the recessed portion.

3. The blade driving device as set forth in claim 1, wherein:
    the lens frame supports integrally lenses that are disposed to the front and to the rear of the blade supporting member.

4. The blade driving device as set forth in claim 1, further comprising:
    a magnet is disposed in the frame or the driving member, and
    a coil is disposed in the other,
    wherein the driving member moves on a plane.

5. The blade driving device as set forth in claim 1, further comprising:
    a connecting member connecting the driving member and the blade member is provided within the frame.

6. The blade driving device as set forth in claim 5, wherein:
    the connecting member is supported through an elastic member preventing rattling.

7. The blade driving device as set forth in claim 1, wherein:
    in the blade member, a plurality of members are provided overlapping, where at least one of the blade members is secured directly to the driving member.

8. The blade driving device as set forth in claim 1, wherein:
    the blade supporting member is provided with a stepped portion structuring the blade chamber.

9. The blade driving device as set forth in claim 1, wherein:

the blade member blocks light that passes through the opening.

10. The blade driving device as set forth in claim 1, wherein:
   the blade member adjusts variably brightness of light that passes through the opening.

11. The blade driving device as set forth in claim 1, wherein:
   the blade member limits a wavelength or brightness of light that passes through the opening.

12. The blade driving device as set forth in claim 1 further comprising:
   a detecting member detecting movement of the driving member or the blade member.

13. An optical unit provided with a blade driving device as set forth in claim 1.

14. A camera provided with a blade driving device as set forth in claim 1.

15. A mobile electronic device provided with a blade driving device as set claim 1.

16. The blade driving device as set forth in claim 1, wherein the direction in which the outer peripheral edge of the frame is recessed and the direction in which the blade supporting member protrudes are perpendicular to the optical axis.

\* \* \* \* \*